(12) United States Patent
Vadari et al.

(10) Patent No.: US 7,245,700 B2
(45) Date of Patent: Jul. 17, 2007

(54) SYSTEM AND METHOD FOR PROVIDING SEALING ARRANGEMENT IN X-RAY TUBE

(75) Inventors: Harith Vadari, Karnataka (IN); Ram Turaga, Bangalore (IN); Mayank Tiwari, Karnataka (IN); Hombe Gowda, Bangalore (IN); Mark Ernest Vermilyea, Niskayuna, NY (US); Frédéric Dahan, Vivaldl (FR); Thomas Saint Martin, Limoura (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/886,080

(22) Filed: Jul. 7, 2004

(65) Prior Publication Data

US 2006/0008056 A1  Jan. 12, 2006

(51) Int. Cl.
*H01J 35/00* (2006.01)
(52) U.S. Cl. .................................. 378/133; 378/130
(58) Field of Classification Search ............... 378/132, 378/133, 144, 130
See application file for complete search history.

(56) References Cited

U.S. PATENT DOCUMENTS

| 5,210,781 | A | * | 5/1993 | Ono et al. ................. 378/132 |
| 6,377,658 | B1 | | 4/2002 | Vermilyea et al. |
| 2002/0141538 | A1* | | 10/2002 | Nakamuta et al. .......... 378/132 |

FOREIGN PATENT DOCUMENTS

EP           479198 B1 *  1/1997

* cited by examiner

*Primary Examiner*—Edward J. Glick
*Assistant Examiner*—Chih-Cheng Glen Kao
(74) *Attorney, Agent, or Firm*—Carl B. Horton, Esq.; Armstrong Teasdale LLP

(57) ABSTRACT

A system and method for providing a sealing arrangement in an X-ray tube are provided. The X-ray tube includes a rotating portion having a plurality of ball bearings and a liquid metal within a housing having the ball bearings therein. The rotating portion is configured to rotate an anode. The X-ray tube further includes a sealing portion formed by a liquid metal vacuum interface configured in a radial direction to resist flow of liquid metal from the housing to a vacuum portion.

23 Claims, 4 Drawing Sheets

SYSTEM AND METHOD FOR PROVIDING SEALING ARRANGEMENT IN X-RAY TUBE

BACKGROUND OF THE INVENTION

The present invention relates generally to X-ray tubes, and more particularly, to lubricant sealing within X-ray tube bearing assemblies.

Various techniques for manufacturing a rotary anode type X-ray tube are known. The rotary anode type X-ray tube typically includes generally, a vacuum chamber, a rotating shaft and a stator. A bearing cartridge also typically is provided between the rotating shaft and the stator and includes a roller type bearing assembly. The rotating shaft is attached to the anode that is rotated using the shaft. The anode includes a target that heats to high temperatures during the operation of the X-ray tube. This is due to the constant impingement of electrons on the surface of the target-bearing cartridge, which accumulates heat generated at the target. As a result, there is a temperature inequality between the rotating shaft and the stator. This causes increased wear and tear of the X-ray tube, which can result in reduced performance.

A lubricant is typically provided in the bearing cartridge to reduce the heat level, wear and thereby increase the life of the bearing. The lubricant equalizes the temperatures of the shaft and the stator. Both solid as well as liquid metal lubricants are used to surround the bearing assembly and increase their conductivity. X-ray tubes containing bearing cartridges, which use liquid metal lubricants (e.g., Gallium or Gallium alloys) typically have a longer life and reduced operation noise at higher gantry loads and at higher anode rotation speeds. However, an appropriate sealing arrangement must be provided to reduce or eliminate the risk of the liquid metal lubricant leaking from the bearing section into the vacuum chamber. Such leakage can cause electrical (high voltage) instability in the X-ray tube, thereby shortening operating life.

In known X-ray tubes, a seal is provided in the form of an axial interface between the liquid metal lubricant and the vacuum chamber, to prevent this leakage. However, the axial interface may not perform adequately at higher loads and speeds.

BRIEF DESCRIPTION OF THE INVENTION

In an exemplary embodiment, an X-ray tube is provided. The X-ray tube includes a rotating portion having a plurality of ball bearings and a liquid metal within a housing having the ball bearings therein. The rotating portion is configured to rotate an anode. The X-ray tube further includes a sealing portion formed by a liquid metal vacuum interface configured in a radial direction to resist the flow of the liquid metal from the housing to a vacuum portion.

In another exemplary embodiment, a rotating device is provided. The rotating device includes a rotating portion having a plurality of ball bearings and a stationary portion. A liquid is provided in a space between the rotating portion and the stationary portion. The rotating device further includes a sealing portion formed by a liquid metal vacuum/ambient fluid interface configured to prevent flow of the liquid metal from the housing to a vacuum/ambient portion.

In another exemplary embodiment, a method for sealing for an X-ray tube is provided. The method includes providing a liquid metal to at least one of lubricate and cool a rotating portion of the X-ray tube. The method further includes configuring a non-contact seal in combination with the rotating portion to prevent fluid flow from the rotating portion to a vacuum portion wherein, with the non-contact seal having a radial interface.

DETAILED DESCRIPTION OF THE INVENTION

In various embodiments of the present invention, a rotating device is provided. The rotating device includes a rotating portion having a plurality of ball bearings and a liquid metal for at least one of lubricating and cooling the ball bearings. The liquid metal is contained within a housing having the ball bearings therein. The rotating device further includes a sealing portion formed by a liquid metal vacuum interface, including, for example, a liquid metal vacuum/ambient fluid interface configured to resist or prevent flow of the liquid metal from the housing to a vacuum/ambient portion. In an exemplary embodiment, the rotating device is an X-ray tube operating in a vacuum environment.

Figure 1:
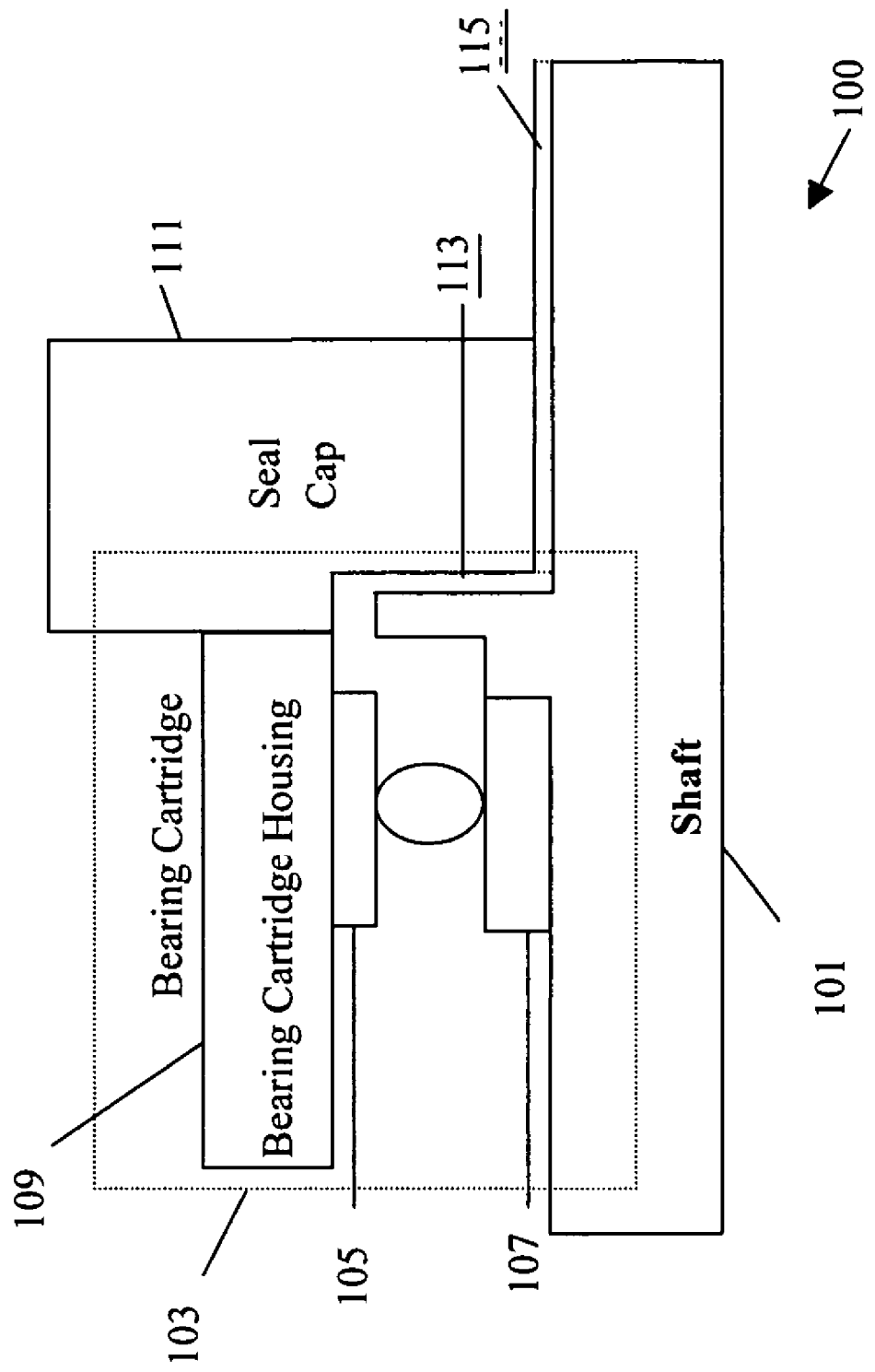
FIG. 1 is a block diagram showing an X-ray tube in accordance with an exemplary embodiment of the invention.

FIG. 1 is a block diagram showing an X-ray tube in accordance with the exemplary embodiment. X-ray tube 100 operates in a vacuum environment and includes a shaft 101, a bearing cartridge 103 having a bearing cartridge housing 109. Further, X-ray tube 100 includes a seal cap 111, an axial clearance 113, and a radial clearance 115. Shaft 101 rotates during the operation of X-ray tube 100 and is coupled to bearing cartridge 103, which includes a bearing assembly. The bearing assembly includes at least one ball bearing coupled with an outer bearing race 105 and inner bearing race 107. The bearing assembly is surrounded by bearing cartridge housing 109, which is sealed by seal cap 111. The bearing assembly enables the rotation of shaft 101, which enables the rotation of an anode (not shown) of X-ray tube 100.

Bearing cartridge housing 109 is filled with a liquid metal lubricant to lubricate and cool the bearing assembly (e.g., in the space between rotating and stationary portions). The liquid metal lubricant in various embodiments is characterized by a large surface tension. The liquid metal lubricant may be, for example, pure gallium, a Gallium alloy or a Gallium Indium Tin alloy.

In operation, the use of a liquid metal may, for example, increase the operating life of X-ray tube 100 and decrease the noise generated by X-ray tube 100. For example, if Gallium Indium Tin alloy is used as the liquid metal lubricant, the operation noise may be reduced, for example, by 10 dB. X-ray tube 100 includes a sealing arrangement to resist or prevent the liquid (e.g., molten) metal lubricant from leaking from bearing cartridge housing 109 into the vacuum environment in which X-ray tube 100 operates.

In various embodiments of the invention, the sealing arrangement includes a first sealing portion and a second sealing portion. The first sealing portion is configured as the primary sealing portion and the second sealing portion is configured as the secondary sealing portion.

The first sealing portion forms a liquid metal vacuum interface in a radial direction. Specifically, the first sealing portion is a non-contact seal defining a radial interface that is formed by axial clearance 113. Axial clearance 113 in one exemplary embodiment is a small gap or capillary that is formed axially between an extension of shaft 101 and seal cap 111, when seal cap 111 is connected to the extension of shaft 101. During the operation of X-ray tube 100, the extension of shaft 101 operates in a rotating motion and seal cap 111 remains in a stationary position. Axial clearance 113 resists or prevents the extension of shaft 101 and seal cap 111 from rubbing against each other to prevent particle generation there between. Particle generation includes, for example, the wear and tear caused by excessive frictional force that is generated when a stationary object rubs against a static object.

The second sealing portion is an axial interface formed by a radial clearance 115, which is a gap or capillary formed radially between shaft 101 and seal cap 111. In various embodiments of the invention, the surface tension that holds prevents the liquid metal vacuum interface from breaking down is inversely proportional to the dimensions of axial clearance 113 and radial clearance 115. In various embodiments of the invention, the dimension of axial clearance 113 for example, can be in the range of 300–1000 microns, whereas that of capillary radial clearance 115 for example, can be in the range of 30–1000 microns. In various embodiments, the dimension of axial clearance 113 and radial clearance 115 are as small as possible.

In operation of X-ray tube 100, shaft 101 may be rotated at high speeds. The radius of the extension of shaft 101 is more than the radius of shaft 101. Therefore, the liquid metal lubricant in axial clearance 113 rotates at a higher average velocity due to the rotation of the extension of shaft 101, which has a larger radius. In addition, the liquid metal lubricant has a very high density. Consequently, a large centrifugal force is generated due to the rotation of the liquid metal lubricant in axial clearance 113. This centrifugal force acts in a radially outward direction. Hence, the direction of the force is towards bearing cartridge-housing 109 and away from the radial interface. This reduces the pressure on the liquid metal lubricant at the liquid metal vacuum interface and stabilizes the flow of the liquid metal lubricant. Therefore, the sealing arrangement forms a vacuum seal to prevent the liquid metal lubricant from escaping from bearing cartridge 103.

Figure 2:
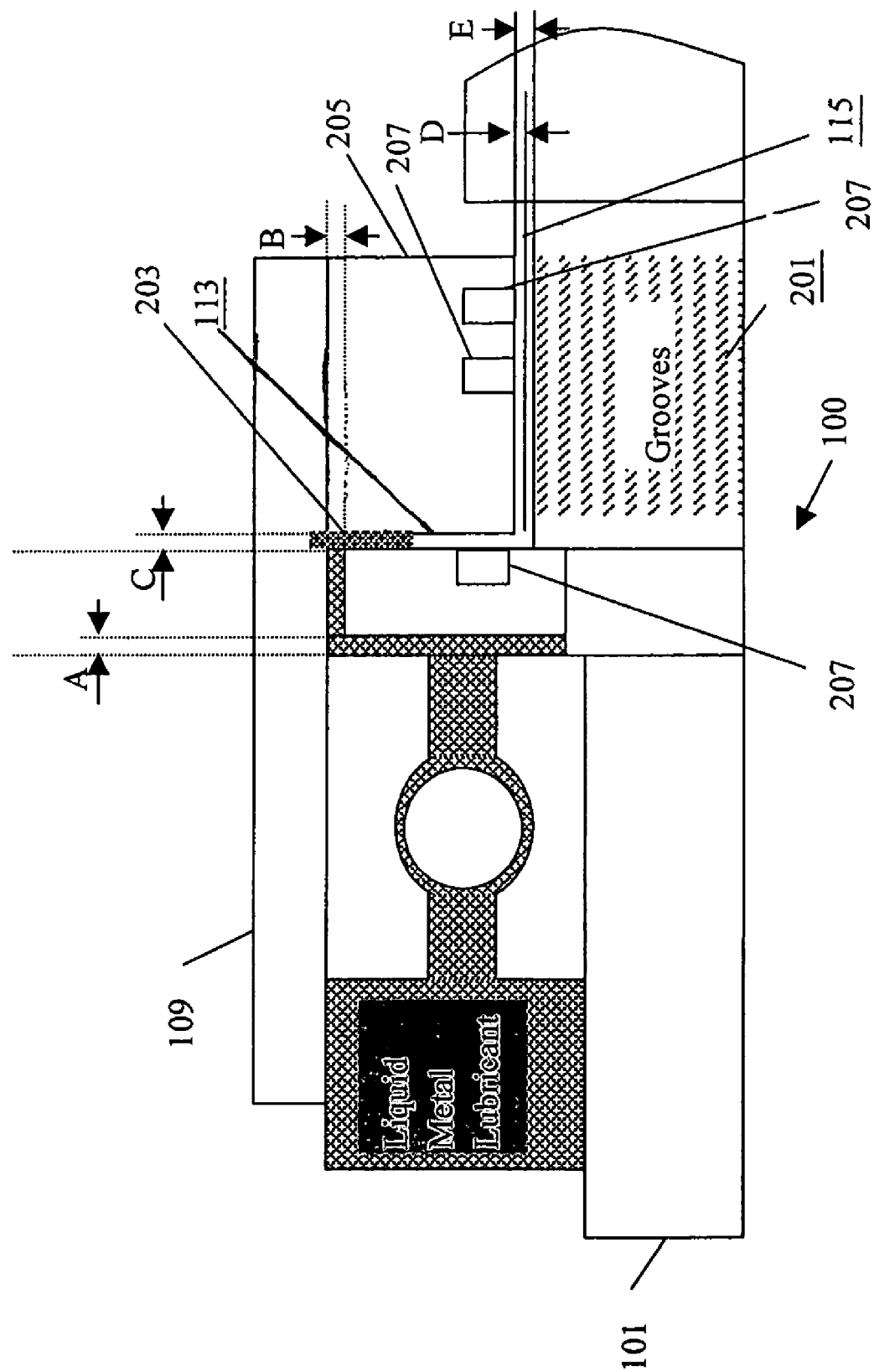
FIG. 2 is a block diagram showing an X-ray tube in accordance with another exemplary embodiment of the invention.

FIG. 2 is a diagram showing X-ray tube 100 in accordance with another exemplary embodiment. X-ray tube 100 further includes spiral grooves 201, a flange portion including a first portion 203, a second portion 205 and droplet collectors 207. First portion 203 is an extension of shaft 101 and second portion 205 is a part of seal cap 111 (shown in FIG. 1). The flange portion 204 is configured in a radial arrangement between shaft 101 and seal cap 111, thereby forming a portion of the liquid metal vacuum interface. Axial clearance is provided by the gap created between first portion 203 and second portion 205.

In various embodiments of the invention, grooves are provided in shaft 101 near radial clearance region D and E of radial clearance 115. The grooves may be, for example, spiral in shape and referred to as spiral grooves 201. Spiral grooves 201 in one embodiment, are oriented in a direction opposite to the direction of the flow of the liquid metal lubricant while X-ray tube 100 is in operation. Spiral grooves 201 function to pump the liquid metal lubricant back into bearing cartridge housing 109 when shaft 101 is rotating. In addition, spiral grooves 201 may facilitate breaking down of vortices that form near radial clearance 115, thereby reducing any axial motion of the liquid metal lubricant when shaft 101 is rotating.

In various embodiments of the invention, grooves are also provided on the side of seal cap 111, which faces first portion 203, near axial clearance 113 and on the side of the extension of shaft 101, which faces bearing cartridge housing 109, near the radial clearance region B. The extension of shaft 101, minimizes the effect of the motion of bearing cartridge 103 on the pressure distribution at the sealing arrangement, which would otherwise experience fluctuating high pressures leading to a breakdown of the liquid metal vacuum interface. In various embodiments of the invention, the distance between the extension of shaft 101 and bearing cartridge housing 109 is kept small. Therefore, the dimension A is kept small. In various embodiments, the flanges and other parts of X-ray tube 100 that contact the liquid metal lubricant are constructed of a non-corrosive material and which also may provide good thermal conduction properties. For example, non-corrosive materials such as Molybdenum & Molybdenum alloys, certain grades of steel such as SS440, SS410, Rex20, SKH4, and the like, may be implemented.

In various embodiments, droplet collectors 207 are provided in seal cap 111 and on extension of shaft 101 to collect any droplets of the liquid metal lubricant that may escape from bearing cartridge 103 to vacuum environment when shaft 101 is rotating. The droplet may form due to large vibration during operation of the x-ray tube or during the transportation of the tube. Droplet collectors 207 are cavities cut cylindrically in seal cap 111 and circularly in the extension of shaft 101. In various embodiments, droplet collectors 207 may have an axial extent, for example, of 2 mm and a radial extent, for example, of 2 mm.

Figure 3:
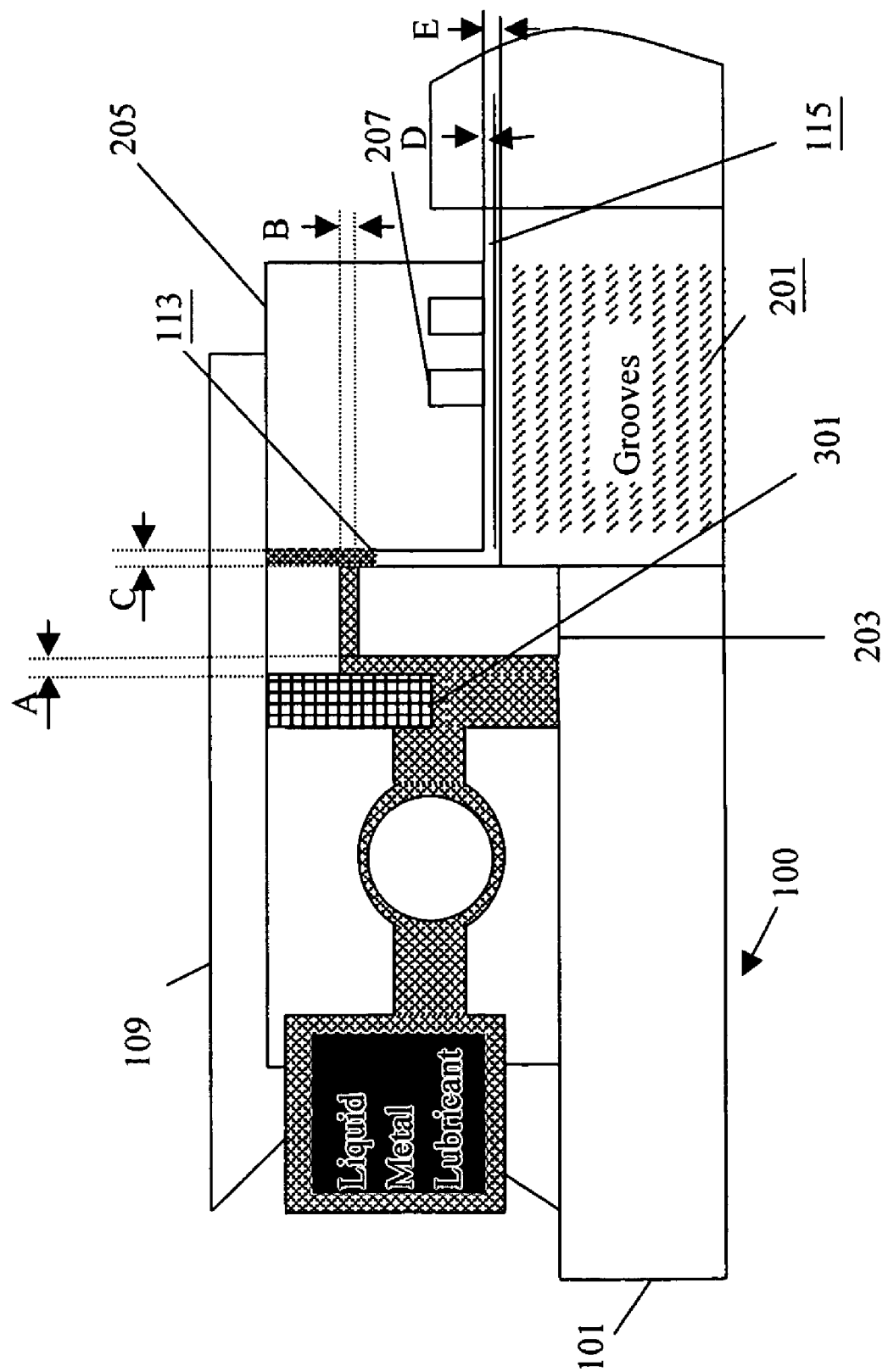
FIG. 3 is a block diagram showing an X-ray tube in accordance with yet another exemplary embodiment of the invention.

FIG. 3 is a diagram showing X-ray tube 100 in accordance with yet another exemplary embodiment of the invention. X-ray tube 100 further includes a third portion 301 for the flange.

Third portion 301 is added to first portion 203. In general, more than one flange portion can be added to the sealing mechanism as desired or needed (e.g., based on sealing requirements). Further, additional clearances, gaps or capillaries also may be added as desired or needed. Second portion 205 pushes the liquid metal lubricant radially outwards, towards bearing cartridge housing 109. As a result, high pressure is exerted on bearing cartridge housing 109 in radial clearance region B. This pressure may push the liquid metal vacuum radial interface towards axial clearance 113 and destabilize the interface, when X-ray tube 100 operates at very high speeds. Spiral grooves are made on the side of third portion 301, which faces second portion 205 near the axial clearance A. The spiral grooves pump the liquid metal lubricant radially inward towards shaft 101. This reduces the pressure exerted in the radially outward direction, thereby ensuring a robust sealing even at very high rotation speeds of shaft 101.

Figure 4:
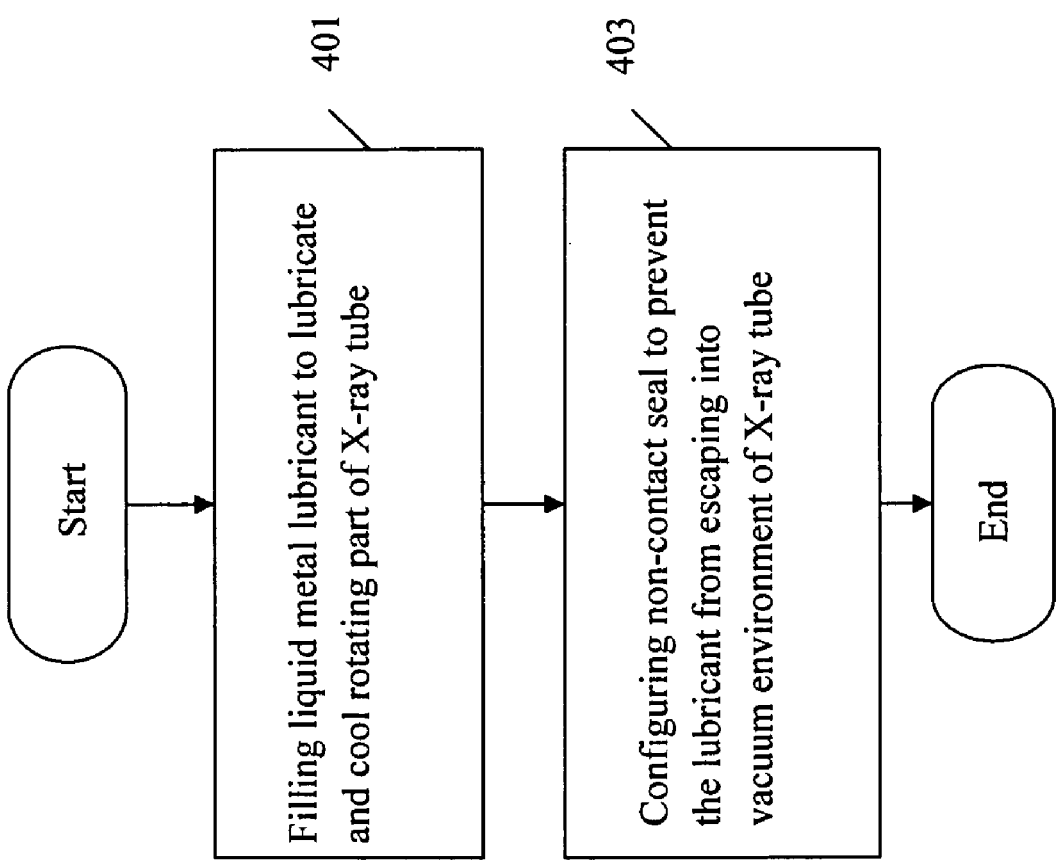
FIG. 4 is a flowchart illustrating a method for sealing a liquid metal lubricant in an X-ray tube in accordance with an exemplary embodiment of the invention.

FIG. 4 is a flowchart illustrating a method for sealing liquid metal lubricant in X-ray tube 100. At 401, bearing cartridge 103 of X-ray tube 100 is filled with a liquid metal lubricant. In various embodiments of the invention, the liquid metal lubricant is a Gallium alloy. The liquid metal lubricant lubricates and/or cools the bearing assembly contained in bearing cartridge 103. The liquid metal lubricant in one embodiment is characterized by a large surface tension.

At 403, a non-contact vacuum seal, including the first sealing portion and the second sealing portion, is provided, in order to prevent the liquid lubricant from escaping into the vacuum environment of X-ray tube 100. The non-contact vacuum seal is created by forming a radial liquid metal vacuum interface as the primary sealing mechanism. The radial liquid metal vacuum interface is formed by axial clearance 113, for example, by creating a small gap between an extension of shaft 101 and seal cap 111 of X-ray tube 100.

Various embodiments of the invention provide an improved sealing arrangement for preventing liquid metal lubricant from escaping into a vacuum environment of an X-ray tube. Various embodiments of the invention improve the performance of the sealing arrangement by stabilizing the lubricant flow near the inlet of the capillary clearance using the flange portion and the axial clearance.

Further, various embodiments of the present invention reduce the likelihood of leakage by providing a radial liquid metal vacuum interface. Various embodiments of the invention also provide an axial liquid metal vacuum interface in addition to the radial liquid metal vacuum interface.

While the invention has been described in terms of various specific embodiments, those skilled in the art will recognize that the invention can be practiced with modification within the spirit and scope of the claims.

What is claimed is:

1. An X-ray tube comprising:
    a radially inner rotating portion having a plurality of ball bearings, the rotating portion configured to rotate an anode coupled to said rotating portion, wherein the rotating portion further comprises a shaft having a flange portion extending from an axis along a length of the shaft towards a direction of a radius of the shaft;
    a liquid metal within a housing having the ball bearings therein; and
    a liquid metal vacuum interface configured to resist a flow of the liquid metal from the housing to a vacuum portion, the liquid metal vacuum interface having a first sealing portion forming a vacuum seal in a radial direction and a second sealing portion forming a vacuum seal in an axial direction, wherein the flange portion forms a portion of the liquid metal vacuum interface.

2. An X-ray tube in accordance with claim 1 wherein the first sealing portion comprises a radial interface and the second sealing portion comprises an axial interface together forming the liquid metal vacuum interface.

3. An X-ray tube in accordance with claim 2 wherein the first sealing portion is configured as a primary sealing portion and the second sealing portion is configured as a secondary sealing portion.

4. An X-ray tube in accordance with claim 2 wherein the radial interface is formed by at least one axial clearance portion and the axial interface is formed by at least one radial clearance portion.

5. An X-ray tube in accordance with claim 4 wherein the at least one axial clearance portion is generally larger than the at least one radial clearance portion.

6. An X-ray tube in accordance with claim 4 wherein the at least one axial clearance portion and one radial clearance portion comprise at least one capillary.

7. An X-ray tube in accordance with claim 4 wherein the at least one axial clearance portion and one radial clearance portion form a labyrinth structure.

8. An X-ray tube in accordance with claim 4 wherein a dimension of the at least one axial clearance portion and one radial clearance portion is determined based on surface tension of the liquid metal.

9. An X-ray tube in accordance with claim 1 further comprising a plurality of grooves formed on at least one of (i) a shaft of the rotating portion, (ii) a flange extending from a shaft of the rotating portion, and (iii) a face of a seal cap facing a flange extending from a shaft of the rotating portion.

10. An X-ray tube in accordance with claim 9 wherein the plurality of grooves are configured in an arrangement opposite in direction to a rotation of the rotating portion.

11. An X-ray tube in accordance with claim 1 wherein the liquid metal comprises one of a gallium alloy, pure gallium, indium, and a tin alloy.

12. An X-ray tube in accordance with claim 1 wherein the liquid metal vacuum interface comprises a non-contact seal forming a gap between the rotating portion and the housing having the ball bearings therein, the non-contact seal configured to prevent the liquid metal from flowing to the vacuum portion.

13. An X-ray tube in accordance with claim 1 wherein the first sealing portion comprises a seal formed by centrifugal force acting on said liquid metal that contacts the housing.

14. An X-ray tube comprising:
    a radially inner rotating portion having a plurality of ball bearings, the rotating portion configured to rotate an anode coupled to said rotating portion, the rotating portion further comprising a shaft having a flange portion extending therefrom and forming a portion of a liquid metal vacuum interface;
    a liquid metal within a housing having the ball bearings therein; and
    a sealing portion formed by the liquid metal vacuum interface configured to resist a flow of the liquid metal from the housing to a vacuum portion, the liquid metal vacuum interface having a first sealing portion forming a vacuum seal in a radial direction and a second sealing portion forming a vacuum seal in an axial direction.

15. An X-ray tube in accordance with claim 14 wherein the flange portion is configured in a radial arrangement.

16. A sealing arrangement for an X-ray tube, the sealing arrangement comprising:
    a radial vacuum interface between a radially inner rotating portion of an X-ray tube and a vacuum portion of the X-ray tube, wherein said radially inner rotating portion is coupled to an anode of the X-ray tube, and wherein the radially inner rotating portion further comprises a shaft having a flange portion extending from an axis along a length of the shaft towards a direction of a radius of the shaft;
    an axial vacuum interface connected to the radial vacuum interface; and
    a liquid metal within the rotating portion, the radial vacuum interface and the axial vacuum interface together configured to prevent flow of the liquid metal to the vacuum portion, wherein the flange portion defines the radial interface.

17. A sealing arrangement in accordance with claim 16 wherein the radial interface comprises a non-contact seal.

18. A sealing arrangement in accordance with claim 16 wherein the radial interface is formed by at least one axial clearance portion and wherein the axial interface is formed by at least one radial clearance portion.

19. A sealing arrangement in accordance with claim 16 wherein the radial interface comprises a plurality of grooves configured in an arrangement in a direction opposite to a rotation of the rotating portion.

20. A sealing arrangement in accordance with claim 16 wherein the liquid metal comprises a gallium alloy.

21. A sealing arrangement for an X-ray tube, the sealing arrangement comprising:
   a radial vacuum interface between a radially inner rotating portion of an X-ray tube and a vacuum portion of the X-ray tube, wherein said radially inner rotatina portion is coupled to an anode of the X-ray tube;
   an axial vacuum interface connected to the radial vacuum interface;
   a liquid metal within the rotating portion, the radial vacuum interface and the axial vacuum interface together configured to prevent flow of the liquid metal to the vacuum portion; and
   a flange extending from a shaft of the rotating portion and defining the radial interface.

22. A rotating device comprising:
   a radially inner rotating portion having a plurality of ball bearings, the rotating portion configured to rotate an anode coupled to said rotating portion, and wherein the rotating portion further comprises a shaft havin a flange portion extending from an axis along a length of the shaft towards a direction of a radius of the shaft;
   a stationary portion;
   a liquid metal in a space between the rotating portion and the stationary portion; and
   a sealing portion formed by a liquid metal vacuum/ambient fluid interface configured to form a vacuum first in a radial direction and second in an axial direction to prevent flow of the liquid metal from a housing to a vacuum/ambient portion using a surface tension of the liquid metal, wherein the flange portion forms a portion of the sealing portion.

23. A method for sealing an X-ray tube, the method comprising:
   providing a liquid metal to lubricate and/or cool a radially inner rotating portion of an X-ray tube, wherein said radially inner rotating portion is coupled to an anode of the X-ray tube, and wherein the rotating portion further comprises a shaft having a flange portion extending from an axis along a length of the shaft towards a direction of a radius of the shaft; and
   configuring a non-contact seal in combination with the rotating portion to prevent fluid flow from the rotating portion to a vacuum portion, the non-contact seal having a radial vacuum interface formed by an axial clearance and an axial vacuum interface formed by a radial clearance together resisting flow of liquid metal, wherein the flange portion of the non-contact seal.

* * * * *

UNITED STATES PATENT AND TRADEMARK OFFICE
CERTIFICATE OF CORRECTION

PATENT NO. : 7,245,700 B2  
APPLICATION NO. : 10/886080  
DATED : July 17, 2007  
INVENTOR(S) : Vadari et al.

Page 1 of 1

It is certified that error appears in the above-identified patent and that said Letters Patent is hereby corrected as shown below:

Column 7, line 9, delete "rotatina" and insert therefor --rotating--.  
Column 7, line 23, delete "havin" and insert therefor --having--.

Signed and Sealed this

Twenty-fourth Day of June, 2008

JON W. DUDAS  
*Director of the United States Patent and Trademark Office*